United States Patent [19]
Sartori

[11] Patent Number: 5,130,032
[45] Date of Patent: Jul. 14, 1992

[54] METHOD FOR TREATING A LIQUID MEDIUM

[76] Inventor: Helfred E. Sartori, P. O. Box 2890, Laurel, Md. 20709

[21] Appl. No.: 552,427

[22] Filed: Jul. 12, 1990

Related U.S. Application Data

[63] Continuation-in-part of Ser. No. 407,252, Oct. 10, 1989, abandoned.

[51] Int. Cl.$^5$ .......................... C02F 1/36; C02F 1/32; C02F 1/48
[52] U.S. Cl. .................................... 210/748; 210/760; 210/764; 210/765; 210/766; 210/759; 210/763; 210/695
[58] Field of Search ............... 261/DIG. 42; 210/760, 210/764, 765, 766, 748, 758, 222, 223, 695, 759, 763; 422/186.07, 186.08, 186.12; 55/100

[56] References Cited

U.S. PATENT DOCUMENTS

| | | | |
|---|---|---|---|
| 2,417,722 | 3/1947 | Wolff | 210/758 |
| 2,717,874 | 9/1955 | Verain | 210/748 |
| 3,549,528 | 12/1970 | Armstrong | 210/760 |
| 3,672,823 | 6/1972 | Boucher | 134/1 |
| 3,682,314 | 8/1972 | Blatter | 261/DIG. 42 |
| 3,856,671 | 12/1974 | Lee et al. | 210/760 |
| 4,003,832 | 1/1977 | Henderson et al. | 261/DIG. 42 |
| 4,007,118 | 2/1977 | Ciambrone | 210/763 |
| 4,012,321 | 3/1977 | Koubek | 210/748 |
| 4,013,552 | 3/1977 | Kreuter | 210/748 |
| 4,029,578 | 6/1977 | Turk | 210/760 |
| 4,040,982 | 8/1977 | Basila et al. | 210/760 |
| 4,064,047 | 12/1977 | Bernreiter et al. | 210/205 |
| 4,076,617 | 2/1978 | Bybel et al. | 210/760 |
| 4,124,467 | 11/1978 | Pincon | 422/186.07 |
| 4,156,652 | 5/1979 | Wiest | 422/186.07 |
| 4,176,061 | 11/1979 | Stopka | 210/205 |
| 4,214,962 | 7/1980 | Pincon | 210/760 |
| 4,229,389 | 10/1980 | Granger | 261/DIG. 80 |
| 4,298,467 | 11/1981 | Gartner et al. | 210/220 |
| 4,412,924 | 11/1983 | Feather | 210/760 |
| 4,437,999 | 3/1984 | Mayne | 210/748 |
| 4,512,900 | 4/1985 | Macur et al. | 210/760 |
| 4,548,716 | 10/1985 | Boeve | 210/760 |
| 4,605,523 | 8/1986 | Smillie | 261/DIG. 80 |
| 4,640,782 | 2/1987 | Burleson | 422/186.12 |
| 4,655,933 | 4/1987 | Johnson et al. | 210/760 |
| 4,719,018 | 1/1988 | Przylbylski | 210/748 |
| 4,728,368 | 3/1988 | Pedziwiatr | 210/748 |
| 4,764,283 | 8/1988 | Ashbrook et al. | 261/DIG. 42 |
| 4,765,965 | 8/1988 | Goudy, Jr. | 261/DIG. 80 |
| 4,836,929 | 6/1989 | Baumann et al. | 210/760 |
| 4,849,114 | 7/1989 | Zeff et al. | 210/760 |
| 4,857,204 | 8/1989 | Joklik | 422/186.08 |
| 4,874,509 | 10/1989 | Bullock | 261/DIG. 80 |
| 4,888,113 | 12/1989 | Holcomb | 55/100 |
| 4,913,827 | 4/1990 | Nebel | 210/748 |
| 4,959,142 | 9/1990 | Dempo | 261/DIG. 80 |
| 5,030,344 | 7/1991 | Ambrose | 55/100 |

FOREIGN PATENT DOCUMENTS 1-38196  2/1989  Japan ................................. 210/222

OTHER PUBLICATIONS

*Catalytic Effects of Ultraviolet Light and/or Ultrasound on the Ozone Odixation of Humic Acid and Tri-Halomethane Precursors*, vol. 7, pp. 47-62, 1985.

*Primary Examiner*—Stanley S. Silverman
*Assistant Examiner*—Cynthia L. Nessler
*Attorney, Agent, or Firm*—Watson, Cole, Grindle & Watson

[57] ABSTRACT

A process for enhancement of chemical oxidation of oxidizable materials comprises storing the materials in suspended or dissolved form in a storage tank, pumping the material from the tank through an electrostatic treater, an ultrasonic ozone disperser, an ultrasonic treatment chamber, and a cooling unit. The material is then returned to the storage tank for subsequent treatments until a target oxidation is achieved. The ozone dispersed by the ultrasonic ozone disperser is first produced in an ozone generator and then enhanced magnetically before or at the point of injection into the treatment loop.

25 Claims, 1 Drawing Sheet

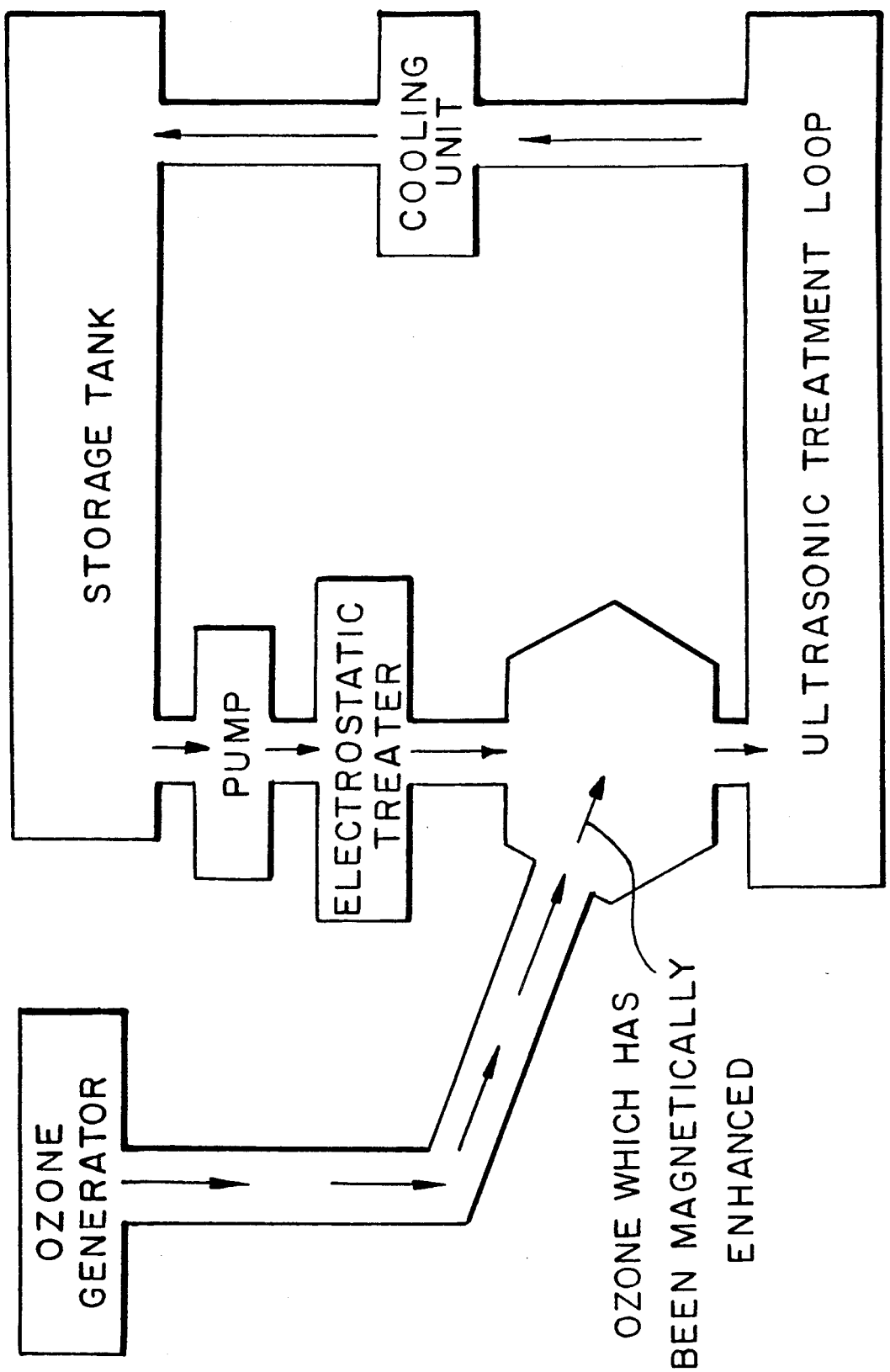

METHOD FOR TREATING A LIQUID MEDIUM

This application is a continuation-in-part of application Ser. No. 07/407252, filed Oct. 10, 1989, now abandoned.

BACKGROUND OF THE INVENTION

1. Field of the Invention

This invention relates to the treatment of toxic waste, wastewater industrial process water, oxidation processes of the chemical and pharmaceutical industries, and any other areas that require oxidation processes. Toxic wastes, including any concentration of chlorinated and non-chlorinated hydrocarbons and alicyclics, including TCB, PCBs, TCE, dioxins, phenols, pesticides, cyanide, and the multitude of other inorganic, organic, and harmful microbiological materials contained in waste effluents that, in general, are only partially degraded by conventional treatment methods, are effectively eliminated by this invention.

2. The Prior Art

Conventional chemical oxidation methods to convert these substances to removable and harmless oxides are generally ineffective, expensive, and detrimental to the environment. U.S. Pat. No. 3,549,528 to Armstrong discloses simply bubbling the ozone into a fluid to be treated and no attempts at ozone hypersaturation are made. However, his and other earlier attempts of the sonic enhancement of ozone by Bybel et al. and Henderson et al. disclosed in U.S. Pat. Nos. 4,076,617 and 4,003,832, respectively, constituted a significant improvement by being more effective and more economical. Enhanced ozone oxidation processes do not have effects detrimental to the environment that are encountered with conventional chemical treatment methods. Numerous chemical enhancers of ozone, including peroxides, catalysts, and ultraviolet have further improved the results of this process.

Although the earlier ozone-sonic oxidation processes constitute an improvement over conventional methods, these improvements were not significant enough to result in a wide-spread use since their invention in the mid-1970's. The same applies to the chemical ozone enhancers that have been in use since at least the 1920's.

In U.S. Pat. No. 4,064,047 Bernreiter describes an electrostatic enhancement system wherein electrically charged waste water is sprayed against the inner surface of a chamber. This type of electrical charge is of low efficiency since it relies mostly on an atomization process and is not applied with the electrodes inside the total fluid flow as in the present invention. Neither his nor any other method described previously provides a continuous or long-term ozone hypersaturation with a magnetic-type charge of the ozone molecules that, in conjunction with the sonic dispersion, maintains a microfine bubble structure leading to a dramatic enhancement of the reaction kinetics and producing a stoichiometric oxidation for high concentrations, e.g. of PCBs, as in this invention. None of the electrostatic pretreatments of dissolved wastes allows for a destruction of low concentration toxics, e.g. of dioxins, within minutes as is claimed for this invention with its unique ozone preparation.

SUMMARY OF THE INVENTION

The present invention relates to a process for the physico-chemical, electromagnetic, and electrochemical enhancement of chemical oxidation of oxidizable materials suspended or dissolved in a liquid medium. The oxidation produces a stoichiometric, quantitative oxidation and concomitant destruction of any concentration of chlorinated and non-chlorinated hydrocarbons and alicyclics, including TCB, PCBs, TCE, dioxins, phenols, pesticides, cyanide, and other oxidizable materials. The physico-chemical enhancement uses sonical and ultrasonical dispersion of the oxidant and synchronized in-flow sonication and ultrasonication. The electrochemical enhancement provides electrical charges to the reactants that, through electrostatic attraction, leads to a multifold enhancement of the oxidation kinetics at low concentrations. The treatment process includes storing material to be treated in a suspended or dissolved state in a storage tank from which a pump pumps the material from the tank into a treatment loop. The treatment loop contains an electrostatic treater, an ultrasonic ozone disperser, an ultrasonic treatment chamber and a cooling unit. After running through the loop, the material is then returned to the storage tank and the process is repeated until a target destruction or oxidation is achieved. Ozone supplied from the ozone disperser is produced in an ozone generator and is enhanced magnetically before or at the point of injection into the treatment loop.

The following are the main innovations presented in this invention:

1. Electrostatic pretreatment as well as an electromagnetic ozone enhancer for electromagnetic enhancement of the oxidation kinetics and for maximum retention of micronized ozone bubbles. This is particularly important for low concentration toxic wastes (ppb range and less) which otherwise are almost impossible to eliminate. This way, dioxins and other low concentration toxics can be eliminated within a few minutes.
2. Sonic/ultrasonic dispersion of ozone in resonance with the sonic and/or ultrasonic physico-chemical enhancement of ozone providing a supersaturation of ozone in the liquid medium. This, in conjunction with the electromagnetic ozone pretreatment, leads to a very prolonged microsize ozone bubble configuration that, by virtue of its large surface, dramatically enhances the reaction kinetics.
3. Multi-cycle or multi-stage flow-through sonication or ultrasonication to produce a quantitative stoichiometric oxidation. The sonic energy applied has to be sufficient to product cavitation and expulsion of waste material or reactants. High energy sonication and large-surface microsize ozone hypersaturation effectively destroy high concentration toxic wastes e.g. PCBs in concentrations of 100,000 ppm and above.

The two (2) main configurations of this invention are:

1. Batch Process Configuration (BPC)

The BPC is an entirely mobile unit that can be dispatched to any toxic waste site or any location where high intensity oxidation is required.

The complete BPC consists of a storage tank, a circulation pump, the electrostatic pretreater, the electromagnetic ozone enhancer, the ozone dispersion unit, the flow-through sonic channel, and a cooling unit. Multiple recirculation takes place until the target destruction or oxidation is achieved.

2. Stationary Flow-Through Configuration (FTC)

The complete FTC configuration consists of the electrostatic pretreater, the electrostatic ozone enhancer, the ozone dispersion unit, and as many flow-through sonic channel units as required to achieve the target destruction or oxidation. The circulation through the system is provided either by a circulation pump or by the effect of gravity forces.

BRIEF DESCRIPTION OF THE DRAWING

FIG. 1 is a flow chart showing a possible sequence of treatment steps according to the present invention.

DETAILS OF THE INVENTION

General

By the method and apparatus of the present invention, any type of industrial or municipal waste, including most types of toxic wastes, can be treated. Specific examples of such waste materials are: dissolved or slurried toxic wastes from toxic waste sites, river sludge, polluted, raw sewage, secondary sewage, and industrial effluent. These materials normally contain a high level of solids in aqueous solution in concentrations from about 1% to 50% with a particle size ranging from about one (1) micron ($\mu$m) to ten (10) centimeters (cm) or more.

The waste material to be treated with this invention can be contaminated with micro-organisms, including pathogenic bacteria and viruses. Other contaminants include fecal matter, synthetic detergents, and other common organic wastes, as well as toxic organic compounds such as pesticides, phenols, TCB, PCBs, TCE, dioxins, difficult to treat organics such as tannin and lignite, cyanide, and other toxic inorganics, nitrates, phosphates, acids, chlorine, manganese, and iron. Liquid media that can be treated by the process of the present invention further include suspensions of untreated or ground toxic wastes in appropriate solvents and water with or without emulsifiers and detergents, groundwater, water for drinking water, industrial waste water, municipal waste water, pool water, cooling tower water, industrial process water, and fresh or seawater from ponds, lakes or rivers.

The micro-organisms and the contaminants are removed by this invention. The result of the process is water of drinking-water quality or better that can be returned to the natural water table, as well as carbon dioxide that enters the carbon cycle of photosynthetic plants and micro-organisms, and small amounts of table salt from the degradation of chlorinated compounds.

The purification process of this invention involves the following steps:

1. Pumping of the liquid phase from the tank into the treatment loop or gravity flow of the continuous flow configuration to the treatment segment.
2. Electrostatic pretreatment with the electrostatic pretreater in the electrostatic segment of the treatment loop.
3. Electromagnetic ozone enhancement and sonic or ultrasonic dispersion of the ozone in the ozone dispersion segment of the treatment loop.
4. High-density sonication or ultrasonication by means of in-flow high power sonication probes in the sonication segment of the treatment loop.
5. Cooling in the cooling segment to keep the reaction temperature below twenty (20) degrees Celsius if possible.

All surfaces of the storage container, the treatment loop, the ozone enhancers, and the pump that are exposed to ozone and toxic and other wastes have to be either coated with polytetrafluorocarbon or made from 304L stainless steel to prevent chemically-induced corrosion. The pump and the cooling system are conventional and therefore need no specific description other than that they are dimensioned to meet the task at hand.

FEATURES OF THE INVENTION

Electrostatic Pretreatment

This is the first unique feature of the present invention.

The electrostatic treaters used in this invention increase the molecular collision rates according to the following formula:

$$A''_{12} = \frac{N_1 N_2 d Z e E}{3n}$$

Where $A''_{12}$ are the number/cm$^3$ sec of the electrostatically induced molecular collisions between two (2) reacting ionic species (1 and 2); $N_1$ and $N_2$ the ions/cm of the two reacting ionic species; $d$ the diameter of species 1 and 2; $Z$ the number of charges per ion; $e$ the ionic charge ($4.8062 \times 10^{10}$ cm$^{3/2}$ g$^{\frac{1}{2}}$/sec); $E$ the electrical potential in volts/cm; and $n$ the absolute water viscosity in poise (0.01 g/cm sec).

This leads to a considerable enhancement of the reaction kinetics during the process of oxidation at all concentrations and particularly in the lower concentration range. Dioxins, for instance, are considered toxic at any concentration even down to 0.1 ppg. At concentrations below about 1.0 ppm, the reaction rates normally are significantly slowed down because of the considerable decrease of molecular collision rates at these concentrations. The electrostatic enhancement as described in this invention allows for the complete destruction of dioxins and other molecules down to 0.1 ppb and less in considerably shorter time than with any conventional system beginning dioxin concentrations below 0.5 ppm are not detectable after 5 minutes of treatment according to the present invention below 2.0 ppm are not detectable after 10 minutes of treatment according to the present invention and below 20 ppm are not detectable after 30 minutes for treatment according to the present invention if this electrostatic pretreatment is applied in conjunction with electrostatic and sonic ozone enhancement.

At higher substrate concentration, the electrostatic treaters slightly improve the reaction kinetics towards a quantitative stoichiometric waste material destruction. Therefore, if only high concentration toxic wastes are treated, electrostatic pretreatment is optional.

Electrostatic and Sonic Ozone Dispersion

This is the second unique feature of the present invention.

Conventional methods of ozone transfer into water work well if the total ozone concentration in the water does not exceed the maximum solubility at any given temperature. For the destruction of large amounts of toxic and other waste, much higher ozone concentrations are required to produce a prompt destruction of the waste materials. For high concentrations or large amounts of waste material, the destruction at or near the maximum solubility of ozone would take a very long time and thus render the process ineffective and uneconomical.

The electromagnetic ozone enhancers used in this invention provide a magnetic-type charge to the ozone molecules that causes individual ozone molecules or very small ozone molecular aggregates to repel each other. This effect lasts anywhere from 10 minutes and up to over one hour depending on the reaction temperature, the pH, the intensity of the sonication, and the type of liquid medium. This type of enhancement makes a considerable ozone hypersaturation possible. At the same time, a very large reaction surface is available that lets ozone react extremely efficiently with the organic and inorganic substances in the solution. Similar effects have been reported by Royal Raymond Rife in San Diego, Calif. since the 1920s, and by Gaston Naessens, now in Rock Forest, Quebec since the 1940s.

Sonic ozone dispersion in conjunction with electromagnetic ozone enhancement produces microfine ozone bubbles of a diameter from smaller than 0.1 to about 0.5 microns with most bubbles between 0.2 and 0.3 microns. As compared with ozone bubbles of 0.5 mm to about 1.0 cm as produced with most conventional dispersion methods, an increase of the reactive surface of the oxygen/ozone bubbles of about 100 million times is achieved with the present invention. This allows the prompt dispatch of the very high oxidation capacity required for the economical destruction of large amounts and high concentrations of waste materials. The dispersion is performed by means such as nozzles or venturis of different geometric shapes applied at different angles to the liquid medium. The sonic dispersion means are used in a single or multiple configuration of different shapes or arrays and are applied at any point of the treatment segment.

This sonic dispersion of the ozone in conjunction with electromagnetic ozone enhancement also contributes to the acceleration of the reaction between the waste materials, ozone, peroxides, and the other oxidation enhancers that may be used in this reaction.

The electromagnetic and sonic ozone dispersion into microbubbles are enhanced by the electrostatic ionization. Since all bubbles have the same polarity of charge, they are prevented from flowing together and are able to maintain their microsize for a much longer time.

In-Flow High Power Sonication

This is the third innovation of the present invention.

Conventional emulsification of the waste material by the sonic energy is performed as a low-efficiency, static process in reaction chambers of varying configurations.

The present invention differs from conventional sonication in that it introduces the sonic transducers in a high velocity water flow of at least 10 m/sec. The turbulence crated around the transducers further enhances the sonic effect and produces an almost stoichiometric quantitative oxidation of the waste materials at higher concentrations (above about 100 ppm).

There are indications that sonic energy is capable of producing additional ozone from the available oxygen and this is another factor that enhances the ozone oxidation process.

For the stationary flow-through configuration, the number of transducer chambers is determined by the prospective type of waste material and the desired minimum effluent concentrations. Even if there is no additional turbulence from a flow rate of less than 10 m/sec, the process is still almost 100% effective.

The size of the flow-through pipes is limited by the size of the effective sonication volume of the transducers. Therefore, for large technical applications, multiple parallel channels have to be used. The minimum power of the full effectiveness of this innovation is about 100 watts sonic energy per cubic decimeter (100 W/L). This is about 100 times more than is achieved with conventional sonication. The multi-cycle or multi-stage, stationary or flow-through sonication to effect a quantitative stoichiometric oxidation is produced by specifically designed sonication probes of any geometric shape, applied at any angle to the liquid medium in any configuration and any array of the probes. Alternatively, the sonicating energy powers the entire wall of the reaction vessel or reaction segment.

EXAMPLES

Example 1

The apparatus consists of an ultrapure water production unit, an ultrasonic cleaning tank, an ozone generator, and in-flow electrostatic plates. With this apparatus, small transformers, condensers, transformer parts, and PCBs up to 10,000 ppm have been successfully detoxified to PCB concentrations below 1.0 ppm. A permit application, demonstration test plan, and operator's manual have been submitted to the USEPA. This technology is very efficient and economical for small-scale operation. There are, however, problems with up-scaling.

Example 2

This apparatus has the following components: a 1,000-liter tank, a sonic power unit of 20 KW that powers a wand vibrating at 120 Hz, a 10 kg/hour ozone generator, in-flow electrostatic plates powered with 100 W, a venturi-type ozone injector the ozone tube which is surrounded by a 5 cm wide and 20 cm high ratio cuff with a 0.5 cm gap (a very powerful permanent magnet), the pump providing a fluid flow of 10 m/sec to power the ozone dispersion from the venturi, and a closed ozone/oxygen circulation system. With this apparatus, trichloroethylene, trichlorobenzene, and PCBs up to 20,000 ppm have been effectively and economically destroyed in the expected 3:1 stoichiometric ratio of ozone to chlorinated hydrocarbon.

Example 3

This apparatus has the following components:
a 1,000-liter 304L stainless steel storage tank
a stainless steel treatment loop of a length of 6 m and an inner diameter of 30 cm containing approximately a volume of 425 liters that contains the treatment elements in the following sequence after the pump: (1) electrostatic treater, (2) ozone injector, and (3) ultrasonic probes
a pump with a capacity of 750 liters/sec providing a speed of the fluid of 10 m/sec
electrostatic treaters powered with 150 W in a hexagonal array after the pump
a 10 kg/hour ozone generator the ozone/oxygen line which is surrounded first by a 60 cm cuff containing the electrostatic ozone enhancer and the by a very powerful permanent magnet in a 20 cm high and 5 cm wide cuff with a 0.5 cm gap
an ultrasonically powered ozone nozzle an array of 12 in-flow ultrasonic probes with a power of 2,500 W each a cooling unit may be added that cools the fluid that returns from the treatment loop to the tank if the unit is operated at ambient temperatures above 15° C. (59° F.) to maintain the average operating temperature below 20° C.

The optimum pH of the reaction is between 8.0 and 9.0 and is maintained by automatically adding $Na_2H_2$ or NaOH as soon as the pH drops below 8.0

During the operation up to 10 kg/hour $H_2O_2$ and small amounts of a catalyst with iron, nickel, copper and other components are added to optimize the reaction kinetics In this configuration, this apparatus is capable of destroying PCBs in excess of 100,000 ppm (i.e., more than a 10% solution), or any other type of chlorinated or non-chlorinated aliphatic or aromatic hydrocarbon or alicyclic compounds. This is an improvement in the effectiveness in excess of ten-fold over the methods of Armstrong, Bernreiter, Bybel, and Henderson.

Dioxins in a concentration of 0.5 ppm are reduced to less than 1.0 ppb in less than 5 minutes, below 2.0 ppm in less than 10 minutes, below 20 ppm in less than 30 minutes. The available literature does not disclose any precise values of the destruction of low concentration wastes. However, it is stated repeatedly that the removal is difficult and generally takes several hours.

What is claimed is:

1. A method of physico-chemical, electromagnetic, and electrochemical enhancement of chemical oxidation of a material suspended or dissolved in a liquid medium, said method comprising:
   (a) electrostatically treating the liquid medium to provide an electrostatic charge to the liquid medium;
   (b) injecting ozone into the electrostatically charged liquid medium through a means which provides a magnetic-type charge to the ozone before or at a point of ozone injection to cause an effective repulsion of individual ozone molecules and small ozone aggregates to maintain a large surface micro-bubble configuration for extended time periods upon injection into the liquid medium, said injection of ozone into the liquid medium forming a mixture of the liquid medium and ozone; and
   (c) subjecting the mixture, after said injecting step, to sonic vibrations with a sonic vibration treating means, thereby contributing to the supersaturation of ozone in the liquid medium.

2. A method as in claim 1, wherein said means through which ozone is injected into the liquid medium in step (b) provides said magnetic-type charge before the point of ozone injection.

3. A method as in claim 1, wherein said means through which ozone is injected into the liquid medium in step (b) provides said magnetic-type charge at the point of ozone injection.

4. A method as in claim 1, wherein said sonic vibrations are ultrasonic vibrations and said sonic vibration treating means is an ultrasonic transducer.

5. A method as in claim 1, further comprising maintaining the pH of the liquid medium to between 8.0 and 9.0.

6. A method as in claim 1, further comprising subjecting the liquid medium to ultraviolet light.

7. A method as in claim 1, further comprising step (d): cooling said mixture after treating with said ultrasonic vibration treating means, to an average temperature of below 20° C.

8. A method as in claim 7, wherein, after said cooling step, steps (a)-(c) are repeated.

9. A method as in claim 1, further comprising adding a chemical enhancement means for enhancing the oxidative potential of ozone to the liquid medium, said chemical enhancement means comprising a catalyst and a reagent.

10. A method as in claim 9, wherein said reagent is selected from the group consisting of hydrogen peroxide and sodium peroxide.

11. A method of physico-chemical, electromagnetic and electrochemical enhancement of chemical oxidation of a material suspended or dissolved in a liquid medium, said method comprising:
   a) pumping said liquid medium from a tank into a treatment loop, said treatment loop comprising, in sequence, a means for electrostatically pretreating the liquid medium, a means for injecting ozone into the liquid medium, a means for providing a magnetic-type charge to ozone which is injected from said means for injecting ozone, and a means for treating the liquid medium with ultrasonic vibrations,
   b) electrostatically charging said liquid medium with said electrostatic pretreatment means,
   c) supplying ozone to said ozone injecting means,
   d) providing a magnetic-type charge to the ozone with said means for providing a magnetic-type charge, said magnetic treating causing an effective repulsion of individual ozone molecules and small ozone aggregates to maintain a large surface micro-bubble configuration for extended time periods upon injection into said liquid medium,
   d) injecting the ozone into said liquid medium, via said ozone injecting means, to form a mixture of said ozone and said liquid medium,
   f) subjecting said mixture to ultrasonic vibrations with said ultrasonic vibration treating means, thereby contributing to the supersaturation of ozone in the liquid medium,
   g) cooling said mixture after step f),
   h) returning said cooled mixture to said tank,
   wherein said method further comprises at least one of the following steps:
   i) adding a chemical enhancement means for enhancing the oxidative potential of ozone to said liquid medium, said chemical enhancement means comprising a catalyst and a reagent selected from the group consisting of hydrogen peroxide and sodium peroxide,
   j) automatically maintaining the pH of the liquid medium between 8.0 and 9.0, and
   k) subjecting said liquid medium to ultraviolet light.

12. A method as in claim 11, wherein said magnetic-type charge in step d) is provided before the point of ozone injection.

13. A method as in claim 11, wherein said magnetic-type charge in step d) is provided at the point of ozone injection.

14. A method as in claim 11, wherein said means for treating the liquid medium with ultrasonic vibrations is an ultrasonic transducer.

15. A method as in claim 11, wherein step a) comprises pumping the liquid medium at a flow rate of at least 10 m/s.

16. A method as in claim 11, wherein step g) comprises cooling said mixture, after step f), to maintain an average operating temperature below 20° C.

17. A method as in claim 11, comprising steps i, j, and k.

18. A method as in claim 17, wherein step a) comprises pumping the liquid medium at a flow rate of at least 10 m/s.

19. A method as in claim 18, wherein step g) comprises cooling said mixture, after step f), to maintain an average operating temperature below 20° C.

20. A method of physico-chemical and electro-chemical enhancement of chemical oxidation of a material suspended or dissolved in a liquid medium, said method comprising:
   a) pumping said liquid medium from a tank into a treatment loop, said treatment loop comprising, in sequence, a means for electrostatically treating the liquid medium, a means for injecting ozone into the liquid medium to form a mixture, and a means for treating the mixture with ultrasonic vibrations, and wherein said liquid medium is electrostatically pretreated by said means for electrostatically treating the liquid medium in said treatment loop,
   b) supplying ozone to said ozone injecting means and magnetically enhancing the ozone before or at the ozone injecting means,
   c) injecting said ozone into said liquid medium via said ozone injecting means, to form a mixture of said ozone and said liquid medium,
   d) subjecting said mixture to ultrasonic vibrations with said means for treating the mixture with ultrasonic vibrations, thereby contributing to the supersaturation of ozone in the liquid medium, and
   e) maintaining the ozone dispersed within the liquid medium by at least one of electrostatic means and said ultrasonic vibration treating means.

21. A method as in claim 20, wherein said means for injecting ozone into the liquid medium comprises an ultrasonic device.

22. A method as in claim 20, wherein said ultrasonic vibration treating means provides at least 100 watts of sonic energy per liter of liquid medium.

23. A method as in claim 20, wherein both electrostatic means and ultrasonic means are used to maintain the ozone dispersed within the liquid medium.

24. A method as in claim 20, wherein said method further comprises at least one of the following steps:
   f) adding a chemical enhancement means for enhancing the oxidative potential of ozone to said liquid medium, said chemical enhancement means comprising a catalyst and a reagent selected from the group consisting of hydrogen peroxide and sodium peroxide,
   g) automatically maintaining the pH of the liquid medium between 8.0 and 9.0, and
   h) subjecting said liquid medium to ultraviolet light.

25. A method as in claim 24, comprising steps f, g and h.

* * * * *